United States Patent
Reh et al.

(10) Patent No.: US 6,793,206 B2
(45) Date of Patent: Sep. 21, 2004

(54) HYDRAULIC VIBRATION-DAMPING SUPPORT

(75) Inventors: Denis Reh, La Chapelle du Noyer (FR); Mikaël Thomazeau, Chateaudun (FR)

(73) Assignee: Hutchinson, Paris (FR)

(*) Notice: Subject to any disclaimer, the term of this patent is extended or adjusted under 35 U.S.C. 154(b) by 0 days.

(21) Appl. No.: 10/273,902

(22) Filed: Oct. 18, 2002

(65) Prior Publication Data

US 2003/0085498 A1 May 8, 2003

(30) Foreign Application Priority Data

Oct. 18, 2001 (FR) .......................................... 01 13437

(51) Int. Cl.[7] .................................................. F16M 5/00
(52) U.S. Cl. .................................. 267/140.13; 267/219
(58) Field of Search ....................... 267/140.13, 140.11, 267/140.4, 141.3, 141.4, 141.7; 248/562, 636

(56) References Cited

U.S. PATENT DOCUMENTS

| | | | | |
|---|---|---|---|---|
| 4,721,292 A | * | 1/1988 | Saito ..................... | 267/140.13 |
| 4,762,309 A | * | 8/1988 | Hutchins ................ | 267/140.13 |
| 4,850,578 A | * | 7/1989 | Katayama et al. ..... | 267/140.13 |
| 4,986,510 A | * | 1/1991 | Bellamy et al. ....... | 267/140.13 |
| 5,571,263 A | * | 11/1996 | Koester et al. ........ | 267/140.13 |
| 6,637,734 B2 | * | 10/2003 | Thomazeau et al. ... | 267/140.13 |

FOREIGN PATENT DOCUMENTS

| | | |
|---|---|---|
| EP | 0 939 243 | 9/1999 |
| FR | 2 714 947 | 7/1995 |

OTHER PUBLICATIONS

International Preliminary Search Report dated Jul. 2, 2002 (2 pages), Appl. No. FR 0113437.

* cited by examiner

*Primary Examiner*—Matthew C. Graham
*Assistant Examiner*—Mariano Sy
(74) *Attorney, Agent, or Firm*—McCracken & Frank LLP

(57) ABSTRACT

A hydraulic vibration-damping support comprising two strength members interconnected by an elastomer body which defines a working chamber filled with liquid and separated from an easily-deformable compensation chamber by a rigid partition. The partition includes a decoupling flap which comprises a flexible membrane mounted to move with clearance between two intermediate gratings mounted on two rings via two elastomer bands.

9 Claims, 4 Drawing Sheets

HYDRAULIC VIBRATION-DAMPING SUPPORT

FIELD OF THE INVENTION

The present invention relates to hydraulic vibration-damping supports.

More particularly, the invention relates to a hydraulic vibration-damping support serving to interconnect two rigid elements for damping purposes, the support comprising at least:

- first and second rigid strength members serving to be fixed to respective ones of the two rigid elements to be interconnected;
- an elastomer body interconnecting the first and second strength members;
- a working chamber filled with liquid, and defined in part by the elastomer body;
- at least one easily-deformable compensation chamber; and
- a decoupling flap which comprises a flexible membrane that is mounted to move with clearance between first and second rigid gratings that communicate respectively with the working chamber and with the compensation chamber, the first and second gratings being carried respectively by first and second rigid support pieces fixed to the second strength member.

BACKGROUND OF THE INVENTION

Document FR-A-2 714 947 describes an example of such a vibration-damping support which is quite satisfactory.

OBJECTS AND SUMMARY OF THE INVENTION

A particular object of the present invention is to improve vibration-damping supports of this type further so as to reduce any banging noise that might appear due to the flexible member of the decoupling flap moving between the two gratings of said flap, in particular when the vibration-damping support serves to mount the engine-and-gearbox unit of a vehicle on the body of the vehicle.

To this end, in the invention, in a vibration-damping support of the type in question, the first and second gratings are connected by elastic links to respective ones of the first and second support pieces (the elastic links in question may optionally be constituted by two zones on the same elastic piece).

By means of these provisions, the movements of the membrane of the decoupling flap against the gratings of said flap are damped due to the flexibility of said elastic links, thereby making it possible to limit or even eliminate the banging noise due to the decoupling flap.

In preferred embodiments of the invention, it is optionally possible, in addition, to use any of the following provisions:

- said elastic links are elastomer links;
- said elastic links have stiffness lying in the range 100 newtons per millimeter (N/mm) to 200 N/mm along an axis that is perpendicular to the first and second gratings;
- the first and second support pieces and the first and second gratings together form a partition which separates the working chamber from the compensation chamber;
- the first and second support pieces are annular and surround respective ones of the first and second gratings, said first and second gratings being connected to respective ones of the first and second support pieces via first and second elastomer bands which constitute said elastic links;
- the first and second support pieces define a constricted passage which puts the working chamber continuously into communication with the compensation chamber;
- the first and second elastomer bands are molded over and bonded to respective ones of the first and second gratings and respective ones of the first and second support pieces;
- the first and second gratings and the first and second support pieces are pieces of cut-out sheet metal that are part of a partition separating the working chamber from the compensation chamber, the first and second support pieces defining at least in part a constricted passage which puts the working chamber continuously into communication with the compensation chamber;
- each of the first and second gratings has a crenelated outer periphery while each of the first and second support pieces has a crenelated inner periphery, the crenelated inner periphery of each support piece being substantially complementary to the crenelated outer periphery of one of the gratings; and
- the outer periphery of each of the first and second gratings forms crenellations that project radially outwards, and the inner periphery of each of the first and second support pieces forms crenellations that project radially inwards, the crenellations of the first and second gratings being disposed substantially in mutual register with the crenellations of the first and second support pieces.

BRIEF DESCRIPTION OF THE DRAWINGS

Other characteristics and advantages of the invention appear from the following description of two embodiments of it given by way of non-limiting example and with reference to the accompanying drawings.

In the drawings.

MORE DETAILED DESCRIPTION

In the various figures, like references designate identical or similar elements.

Figure 1:
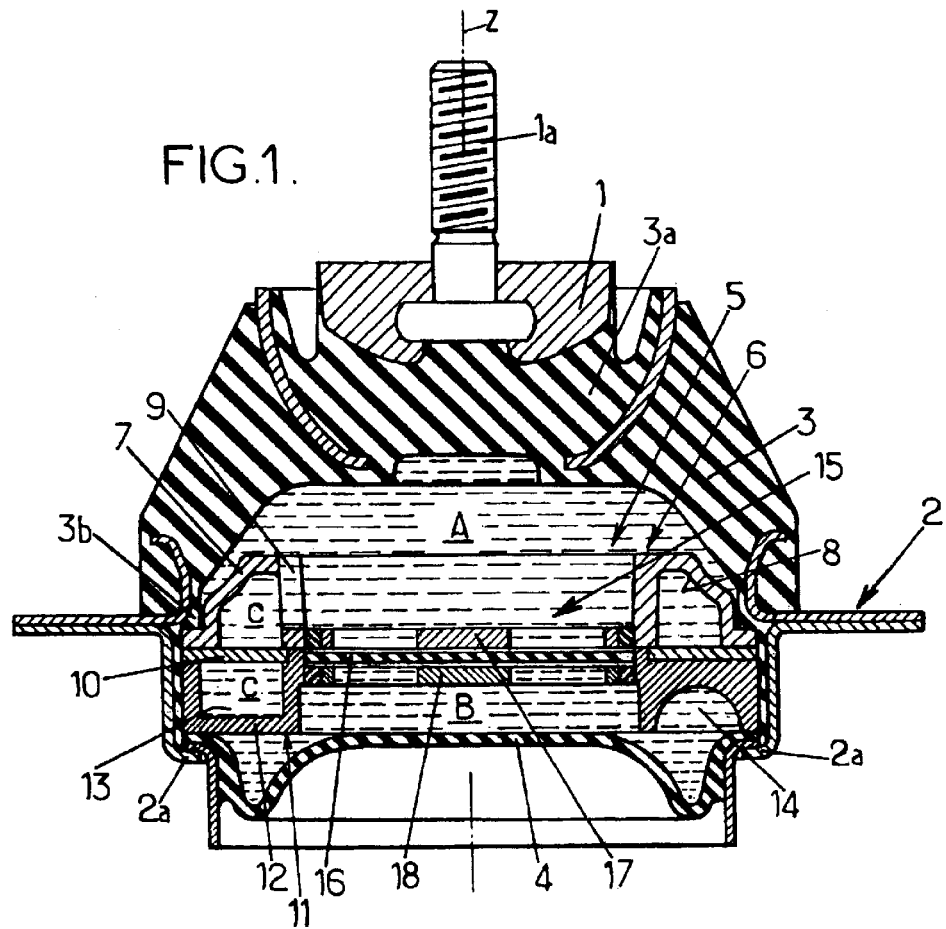
FIG. 1 is an axial section view of a vibration-damping support in a first embodiment of the invention.

FIG. 1 shows a hydraulic vibration-damping support serving, for example, to connect the engine-and-gearbox unit of a vehicle to the body of said vehicle.

This vibration-damping support comprises:

- a first rigid metal strength member 1 which, in the example shown, is in the form of a block serving, for example, to support the engine-and-gearbox unit of the vehicle, in particular by means of a pin 1*a*;

a second rigid metal strength member 2 which, in the example shown, is annular in shape and centered on the vertical axis Z of the pin 1*a*, said second strength member serving, for example, to be fixed to the body of the vehicle;

a bell-shaped elastomer body 3 that is substantially frustoconical and that interconnects the first and second strength members 1 and 2, the elastomer body extending along the axis Z between firstly a top 3*a* molded over and bonded to the first strength member 1 and secondly an annular base 3*b* molded over and bonded to the second strength member 2, the wall of the elastomer body 3 being thick enough to withstand the vertical compression forces due to taking up the weight of the engine-and-gearbox unit;

a thin and flexible elastomer wall 4 that is, for example, bellows-shaped, and that is connected in leaktight manner to the second strength member 2 (in particular by crimping tabs 2*a* provided on the second strength member) so as to co-operate with the elastomer body 3 to define a leaktight volume filled with liquid;

a rigid partition 5 which is secured to the second strength member 2 and which is clamped between the base 3*b* of the elastomer body and the folded over tabs 2*a* of the second strength member, the rigid partition 5 extending perpendicularly to the axis Z and separating the internal volume of the vibration-damping support into firstly a working chamber A defined in part by the elastomer body, and secondly a compensation chamber B that is easily deformable and that is defined in part by the thin elastomer wall 4.

The working and compensation chambers A, B are connected together continuously via a constricted passage C defined inside the rigid partition 5 and extending angularly at the outer periphery of the partition.

In the particular example shown in the drawings, the constricted passage C extends over more than one turn and over two stages, and the rigid partition 5 is made up of three pieces:

a top piece 6 having a ring 7 which, for example, is made of molded light alloy, and which internally defines a groove 8 that is open facing downwards, the groove communicating with the working chamber A via an opening 9;

an intermediate sheet metal washer 10 which is pressed under the ring 7 so as to close the groove 8 downwards, thereby defining the top stage of the constricted passage C, the washer 10 having an opening (not shown) which puts the top stage of the constricted passage C into communication with the bottom stage of said passage; and a bottom piece 11 having a peripheral annular ring 12 which is made, for example, of a molded light alloy, and which internally defines a groove 13 that is open upwards and that is closed off by the above-mentioned washer 10, the groove 13 defining the bottom stage of the constricted passage C and communicating with the compensation chamber B via an opening 14.

Naturally, the constricted passage C may extend over a single stage and be defined, for example, merely by two pieces forming the rigid partition 5.

Figure 2:
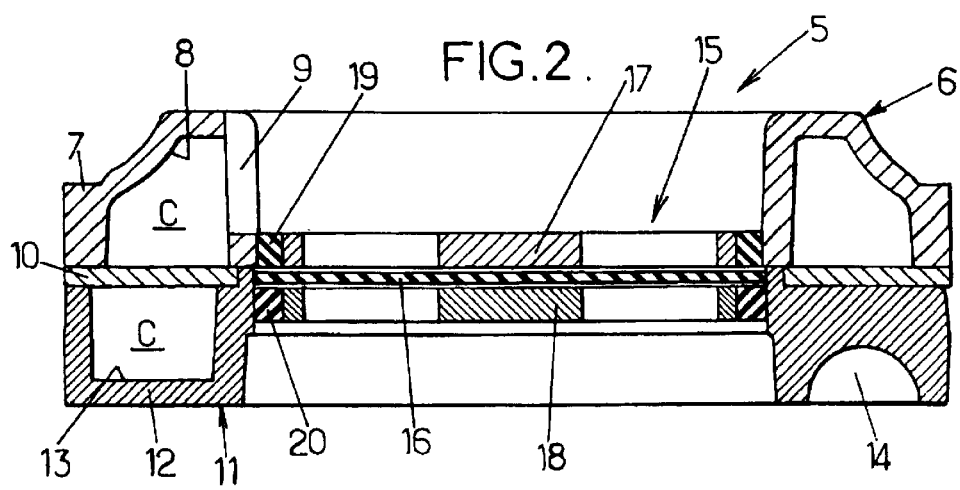
FIG. 2 is a detail view of the rigid partition that separates the two hydraulic chambers of the vibration-damping support of FIG. 1.

In addition, as can be seen in more detail in FIG. 2, the rigid partition 5 is further provided with a decoupling flap 15 which comprises an elastomer membrane 16 mounted with a small amount of clearance (e.g. about 0.5 millimeters (mm)) between two gratings 17, 18 which put the two faces of the membrane 16 into communication respectively with the working chamber A and with the compensation chamber B. Thus, the membrane 16 comes into leaktight abutment alternately against both of the gratings 17, 18 when the strength members 1, 2 are subjected to relative vibratory movements.

For example, the gratings 17, 18 may be made of a rigid material, and in particular of metal.

The grating 17 is part of the top piece 6 of the rigid partition, and it is connected elastically to the ring 7, advantageously by an elastomer band 19 which is interposed radially between the grating 17 and the ring 7, and which is molded over and bonded to both the grating and the ring.

Likewise, the grating 18 belongs to the bottom piece 11 of the rigid partition and is connected elastically to the ring 12, preferably by an elastomer band 20 which is interposed radially between the grating 18 and the ring 12, and which is molded over and bonded to both the grating and the ring.

Preferably, the elastomer bands 19, 20 are of stiffness lying in the range 100 N/mm to 200 N/mm along the axis Z.

Thus, when the first and second strength members 1, 2 are subjected to relative vibratory movements of small amplitude (e.g. smaller than 1 mm) and of high frequency (e.g. higher than 20 hertz (Hz)), the membrane 16 vibrates between the gratings 17, 18, thereby absorbing the vibrations.

When the amplitude of the vibrations is large enough for the membrane 16 to strike the gratings 17, 18 alternately, the elastic connection between the gratings and the rings 6, 11 prevents banging noises from being generated. In addition, the stiffness of the elastomer bands 19, 20 is high enough to prevent the gratings from moving significantly.

Furthermore, when the first and second strength members 1, 2 are subjected to vibratory movements of large amplitude (e.g. larger than 1 mm) and of low frequency (e.g. lower than 20 Hz), such movements causing liquid to be transferred between the chambers A and B via the constricted passage C, which damps vibration in particular in the vicinity of its resonance frequency (generally chosen to lie in the range 10 Hz to 20 Hz).

Figure 3:
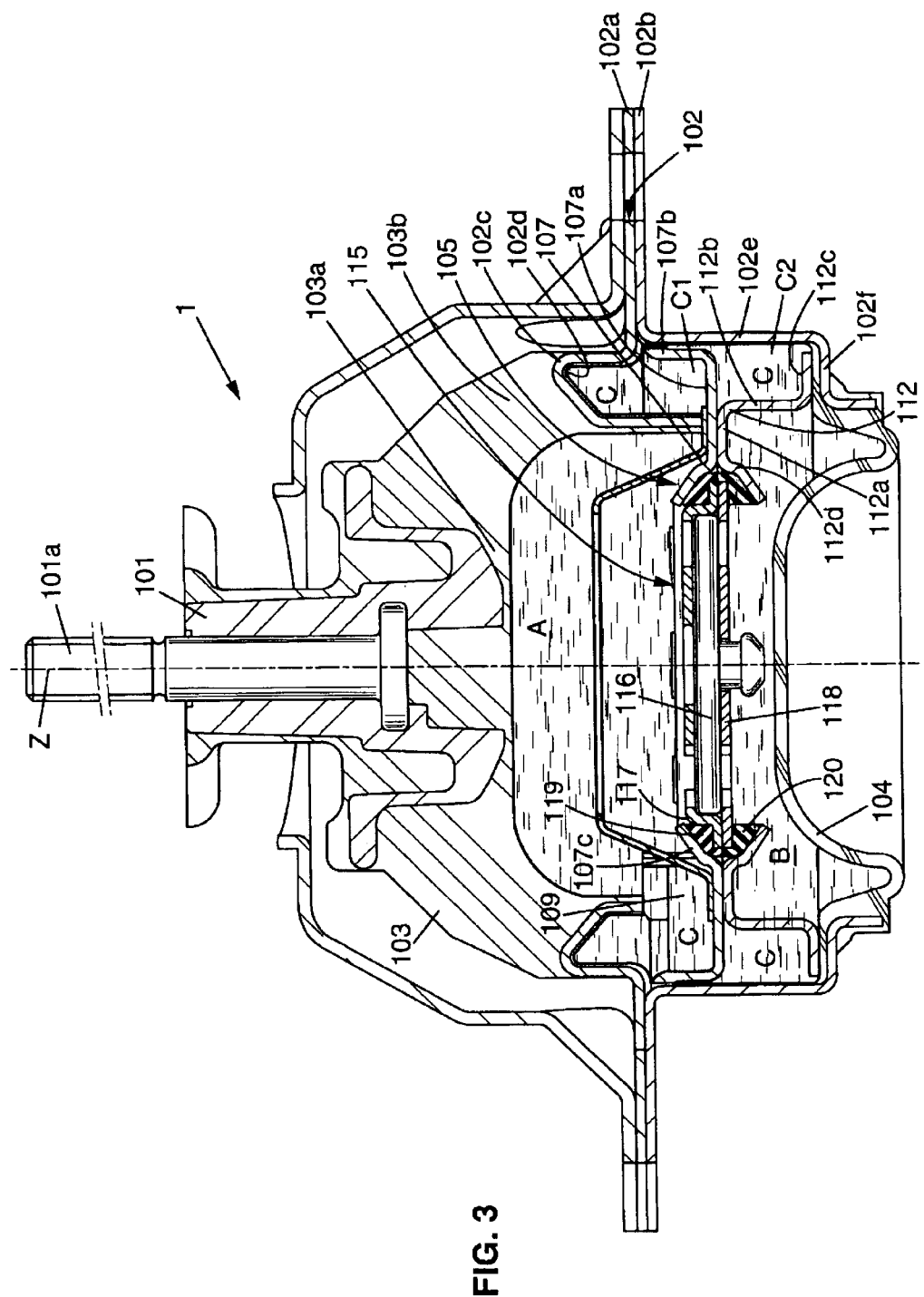
FIG. 3 is an axial section view of a vibration-damping support in a second embodiment of the invention.

In the second embodiment of the invention, shown in FIG. 3, the hydraulic vibration-damping support also, as above, includes first and second rigid metal strength members 101, 102 that are connected together via an elastomer body 103.

The first strength member 101 may be a top block serving to be connected, for example, to the engine-and-gearbox unit of the vehicle, in particular by means of a pin 101*a*.

The second strength member 102 is annular in shape, centered on a vertical axis Z, and serves, for example, to be fixed to the body of the vehicle.

In the example shown, the second strength member 102 is made up of two pieces of sheet metal 102*a*, 102*b*.

The piece of sheet metal 102*a* may be provided with a stamped inner portion 102*a* which forms an annular groove 102*d* that is open facing downwards.

The piece of sheet metal 102*b* has a side wall 102*e* which, for example, may be cylindrical and centered on the axis Z, said side wall extending downwards to an inner annular abutment margin 102*f*.

The elastomer body 103 may, for example, be bell-shaped, extending along the axis Z between firstly a top 103*a* molded over and bonded to the first strength member 101 and secondly an annular base 103*b* molded over and bonded to the stamped inner portion 102*c* of the piece of sheet metal 102*a*. As in the above-described example, the wall of the elastomer body 103 is thick enough to withstand the vertical compression forces due to taking the weight of the engine-and-gearbox unit of the vehicle.

In addition, the vibration-damping support further includes a thin and flexible elastomer wall 104 which may, in particular, be in the form of a bellows, and whose periphery is connected in leaktight manner to the second strength member 102. In the example in question, the periphery of the flexible wall 104 is molded over and bonded to the inner annular abutment margin 102f.

The flexible wall 104 co-operates with the second strength member 102 and with the elastomer body 103 to define a closed casing filled with liquid and that is separated into two by a rigid central partition 105 that extends substantially perpendicularly to the axis Z.

A working chamber A filled with liquid is thus defined between the partition 105 and the elastomer body 103, while a compensation chamber B that is easily deformable and also filled with liquid is defined between the partition 105 and the flexible wall 104.

As in the first embodiment of the invention, the working chamber A and the compensation chamber B may advantageously be connected together continuously via a constricted passageway C which is defined at least in part by the rigid partition 5 and which extends angularly around the outer periphery of said partition.

Figure 4:
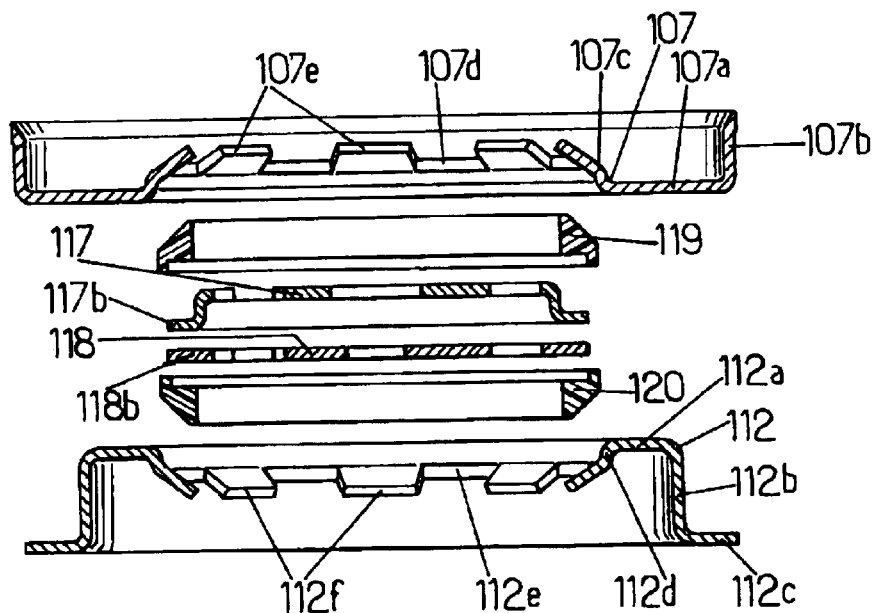
FIG. 4 is an exploded view of the various component parts of the central partition of the vibration-damping support of FIG. 3.
Figure 5:
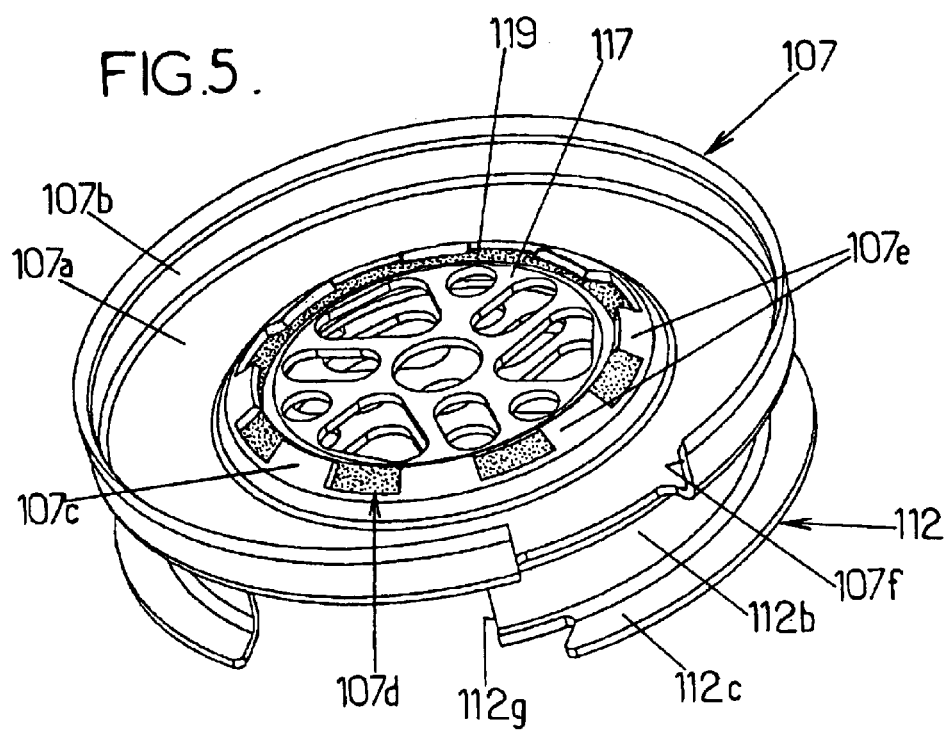
FIG. 5 is a perspective view of the central partition of the vibration-damping support of FIG. 3, without the membrane of its decoupling flap.

In the example considered herein, the partition 105 includes a first support piece 107 made of cut-out and stamped sheet metal (see also FIGS. 4 and 5). The first support piece has a plane annular portion 107a that is extended outwardly by an annular rim 107d and internally by a stamped portion 107c. The stamped portion 107c has a crenelated inner annular edge 107d provided with a plurality of crenellations or teeth projecting radially inwards.

The rim 107b of the first support piece 107 is engaged substantially snugly in the above-mentioned side wall 102e (see FIG. 3), and has a free top end in leaktight contact with a layer of elastomer molded over the bottom face of the piece of sheet metal 102a.

In addition, the base 103a of the elastomer body and the stamped portion 102c of the piece of sheet metal 102a are in leaktight abutment against the plane annular portion 107a of the first support piece 107.

In the example shown, an annular deflector 106 made of sheet metal may optionally be interposed between the base of the elastomer body and the annular portion 107a of the first support piece, said annular deflector having a frusto-conical portion that extends into the working chamber A while converging upwards.

The rigid partition 105 further includes a second support piece 112 made of cut-out and stamped sheet metal. Said second support piece may have a plane annular portion 112a which is extended outwards and downwards by an axial step 112d itself extended radially outwards by an annular abutment margin 112c. The plane annular portion 112a is also extended inwards by a stamped inner portion 112d which has a crenelated inside edge 112d provided with a plurality of crenellations or teeth 112f that project radially inwards.

The uninterrupted annular portion 112a of the second support piece is in leaktight contact against the annular portion 107a of the first support piece, and the outer abutment margin 112c of said second support piece is in leaktight contact against the above-mentioned inner margin 102f.

Thus, the first support piece 107 co-operates with the above-mentioned groove 102d to define a first stage C1 of the constricted passage C, the first stage communicating with the working chamber A via an opening 109 provided in the stamped bottom portion 102c.

In addition, a second stage C2 of the constricted passage C is also defined between firstly the first and second support pieces 107, 112 and secondly the side wall 102e that is part of the piece of sheet metal 102b. The second stage C2 communicates with the first stage C1 via a recess 107f provided in the first support piece 107, and with the compensation chamber B via a recess 112g provided in the second support piece 112 (see FIG. 5).

Furthermore, the stamped portions 107c, 112d of the first and second support pieces define between them a housing for receiving a decoupling flap 115 which performs the same function as in the first embodiment, and which comprises a flexible elastomer membrane 116 mounted with a small amount of axial clearance between two gratings 117, 118 made of sheet metal.

In the example in question, the first grating 117 is stamped, while the second grating 118 is plane, but both of the gratings could optionally be of identical shape.

The first and second gratings 117, 118 are stacked up one on the another, and two elastic links made of elastomer, e.g. constituted by two elastomer bands 119, 120 are interposed between respective ones of the gratings 117, 118, and the corresponding support pieces 107, 112.

It should be noted that the elastomer bands 119, 120 could be made in one piece which is then engaged around the peripheries of the gratings 117, 118. In which case, the vibration-damping support of the invention still has two elastic links connecting respective ones of the gratings 117, 118 to the corresponding support piece 107, 112, but the elastic links are constituted by two zones of the same piece.

Figure 6:
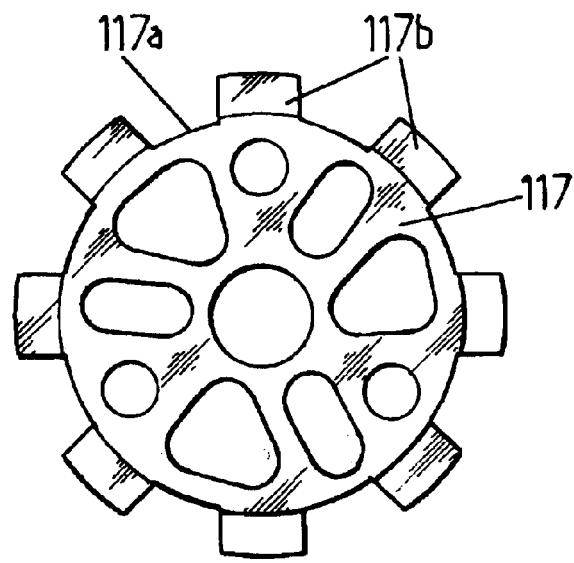
FIGS. 6 and 7 are plan views of the gratings belonging to the central partition of FIGS. 4 and 5.
Figure 7:
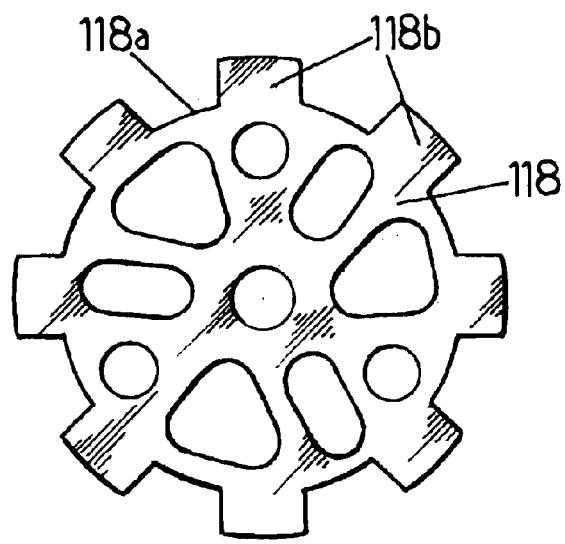

As can be seen in FIGS. 6 and 7, each of the first and second gratings 117, 118 preferably has a crenelated outer periphery, respectively 117a and 118a, which is provided with crenellations or teeth, respectively 117d and 118d, which project radially outwards.

These crenelated peripheries 117a, 117b are preferably of shape complementary to the crenelated inner peripheries 107d, 112e of the first and second support pieces, so that the gratings 117, 118 can be cut out from the same sheet metal blanks as the support pieces 107, 112.

Advantageously, as can be seen in particular in FIG. 4, the crenellations 117d, 118d, 107e, 112f are disposed to be mutually in register so that pinching of the elastomer bands 112, 120 between said crenellations does not generate too large a shear force on said elastomer bands. It should be noted that, in a variant of the invention, one of the elastomer bands 117, 118 could be molded over and bonded between the first support piece 107 and the first grating 117, the other elastomer band being molded over and bonded between the support 112 and the second grating 118.

What is claimed is:

1. A hydraulic vibration-damping support serving to interconnect two rigid elements for damping purposes, the support comprising at least:

first and second rigid strength members serving to be fixed to respective ones of the two rigid elements to be interconnected;

an elastomer body interconnecting the first and second strength members;

a working chamber filled with liquid, and defined in part by the elastomer body;

at least one easily-deformable compensation chamber; and a decoupling flap which comprises a flexible membrane that is mounted to move with clearance between first and second rigid gratings that communicate respectively with the working chamber and with the compensation chamber, the first and second gratings being carried respectively by first and second rigid support pieces fixed to the second strength member;

wherein the first and second rigid gratings and the rigid support pieces together define a partition that separates the working chamber and the compensation chamber and wherein the first and second gratings are connected by elastic links to respective ones of the first and second support pieces.

2. A vibration-damping support according to claim 1, in which said elastic links are elastomer links.

3. A hydraulic vibration-damping support serving to interconnect two rigid elements for damping purposes, the support comprising at least:

first and second rigid strength members serving to be fixed to respective ones of the two rigid elements to be interconnected;

an elastomer body interconnecting the first and second strength members;

a working chamber filled with liquid, and defined in part by the elastomer body;

at least one easily-deformable compensation chamber; and a decoupling flag which comprises a flexible membrane that is mounted to move with clearance between first and second rigid gratings that communicate respectively with the working chamber and with the compensation chamber, the first and second gratings being carried respectively by first and second rigid support pieces fixed to the second strength member;

wherein the first and second rigid gratings are connected by elastic links to respective ones of the first and second support nieces in which said elastic links have stiffness lying in the range 100 N/mm to 200 N/mm along an axis that is perpendicular to the first and second gratings.

4. A vibration-damping support according to claim 1, in which the first and second support pieces are annular and surround respective ones of the first and second gratings, said first and second gratings being connected to respective ones of the first and second support pieces via first and second elastomer bands which constitute said elastic links.

5. A vibration-damping support according to claim 4, in which the first and second elastomer bands are molded over and bonded to respective ones of the first and second gratings and respective ones of the first and second support pieces.

6. A hydraulic vibration-damping support serving to interconnect two rigid elements for damping purposes, the support comprising at least:

first and second rigid strength members serving to be fixed to respective ones of the two rigid elements to be interconnected;

an elastomer body interconnecting the first and second strength members;

a working chamber filled with liquid, and defined in part by the elastomer body;

at least one easily-deformable compensation chamber; and a decoupling flay which comprises a flexible membrane that is mounted to move with clearance between first and second rigid gratings that communicate respectively with the working chamber and with the compensation chamber, the first and second gratings being carried respectively by first and second rigid support pieces fixed to the second strength member;

wherein the first and second gratings are connected by elastic links to respective ones of the first and second support pieces;

wherein the first and second support pieces are annular and surround respective ones of the first and second gratings, said first and second gratings being connected to respective ones of the first and second support pieces via first and second elastomer bands which constitute said elastic links and wherein the first and second support pieces define a constricted passage which puts the working chamber continuously into communication with the compensation chamber.

7. A hydraulic vibration-damping support serving to interconnect two rigid elements for damping purposes, the support comprising at least:

first and second rigid strength members serving to be fixed to respective ones of the two rigid elements to be interconnected;

an elastomer body interconnecting the first and second strength members;

a working chamber filled with liquid, and defined in part by the elastomer body;

at least one easily-deformable compensation chamber; and a decoupling flay which comprises a flexible membrane that is mounted to move with clearance between first and second rigid gratings that communicate respectively with the working chamber and with the compensation chamber, the first and second gratings being carried respectively by first and second rigid support pieces fixed to the second strength member;

wherein the first and second gratings are connected by elastic links to respective ones of the first and second support pieces and wherein the first and second gratings and the first and second support pieces are pieces of cut-out sheet metal that are part of a partition separating the working chamber from the compensation chamber, the first and second support pieces defining at least in part a constricted passage which puts the working chamber continuously into communication with the compensation chamber.

8. A vibration-damping support according to claim 7, in which each of the first and second gratings has a crenelated outer periphery while each of the first and second support pieces has a crenelated inner periphery, the crenelated inner periphery of each support piece being substantially complementary to the crenelated outer periphery of one of the gratings.

9. A vibration-damping support according to claim 8, in which the outer periphery of each of the first and second gratings forms crenellations that project radially outwards, and the inner periphery of each of the first and second support pieces forms crenellations that project radially inwards, the crenellations of the first and second gratings being disposed substantially in mutual register with the crenellations of the first and second support pieces.

\* \* \* \* \*